US006487844B1

(12) United States Patent
Lohn et al.

(10) Patent No.: US 6,487,844 B1
(45) Date of Patent: Dec. 3, 2002

(54) AEROSPIKE AUGMENTATION OF MICROTHRUSTER IMPULSE

(75) Inventors: Peter D. Lohn, Torrance; David H. Lewis, Irvine; Wingsiu R. Chan, Pasadena, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/449,427

(22) Filed: Nov. 24, 1999

(51) Int. Cl.[7] .............................. F02G 1/00; F02G 3/00; F02K 3/00
(52) U.S. Cl. ...................................................... 60/200.1
(58) Field of Search ........................... 60/200.1, 203.1, 60/271; 137/68.19, 74, 76

(56) References Cited

U.S. PATENT DOCUMENTS

| | | | | |
|---|---|---|---|---|
| 3,316,719 A | * | 5/1967 | Loprete ........................ | 60/256 |
| 4,399,655 A | * | 8/1983 | Föhl .............................. | 60/637 |
| H795 H | * | 7/1990 | Maykut et al. ................ | 60/233 |
| 5,201,832 A | * | 4/1993 | Porter et al. ............. | 244/158 R |
| 5,661,970 A | * | 9/1997 | Müller et al. ................. | 60/233 |
| 5,857,698 A | * | 1/1999 | Fuerst et al. ......... | 137/68.19 X |
| 6,131,385 A | * | 10/2000 | Lewis, Jr. et al. .......... | 60/203.1 |

OTHER PUBLICATIONS

Boeing Inc., http://www.boeing.com/space/rdyne/x33/aero-spik/basics/pics/test7.jpg, Apr. 1998.*
NASA, http://www.hq.nasa.gov/office/pao/History/x–33/aero_faq.htm, Dec. 1998.*
Boeing Inc., http://www.boeing.com/space/rdyne/x33/index.html, Aug. 1999.*
Boeing Inc., http://www.boeing.com/space/rdyne/x33/aero-spik/basics/descript.htm, Aug. 1999.*
Boeing Inc., http://www.boeing.com.space.rdyne/x33/aero-spik/basics/pics/test1.jpg, Apr. 1998.*
"Micromechanics, Little Bangs, Making Thrusters for Micromachines", *Scientific American*, Nov. 1998, pp. 50–51.
"Micromachines, Fomenting a Revolution, in Miniature", *Science*, Vo. 282, Oct. 16, 1998, pp. 402, 403 and 405.

\* cited by examiner

*Primary Examiner*—Charles G. Freay
*Assistant Examiner*—W Rodriguez
(74) *Attorney, Agent, or Firm*—Antonelli, Terry, Stout & Kraus, LLP

(57) ABSTRACT

A microthruster (11) provides a small unit force. The microthruster is useful, for example, as a propellant for a microsatellite. The microthruster includes an aerospike (12) extending outwardly beyond the face of an outer wall of the chamber (14) of the microthruster in the vicinity of an outlet nozzle thereof formed by two diaphragms or burst disks (15, 16), closing the chamber on respective sides of the aerospike. The aerospike is preferably formed integrally with the chamber by batch microelectronic fabrication methods. Higher thrust efficiency and more controllable and uniform impulse characteristics are attainable with the microthruster and with an array (17) comprising a plurality of the microthrusters.

21 Claims, 3 Drawing Sheets

2 x 2 Array of Axis
Symmetric Elements 2 x 2 Array of Linear
Elements

AEROSPIKE AUGMENTATION OF MICROTHRUSTER IMPULSE

CROSS-REFERENCE TO RELATED APPLICATION

Reference is made to copending, U.S. patent application Ser. No. 08/912,709, filed Aug. 18, 1997, now U.S. Pat. No. 6,131,385, issued Oct. 17, 2000, for Integrated Pulsed Propulsion System for Microsatellite, the disclosure of which is hereby incorporated by reference.

FIELD OF THE INVENTION

The present invention relates to a microthruster which provides a small unit of force and, more particularly, to a microthruster for use as propellant device for translating or rotating a microsatellite.

BACKGROUND AND SUMMARY OF THE INVENTION

The use of extremely small thrust impulse bits in packages of sub-millimeter length scales is under consideration for a wide variety of applications. The small size has so far made it desirable to keep the construction simple by producing only a simple burst disk nozzle opening Upon opening a burst disk, the gas expels from the thrust chamber and produces an impulse. U.S. patent application Ser. No. 08/912,709 referred to above discloses an integrated pulsed propulsion and structural support system for a microsatellite employing a microthruster capable of being fabricated by batch processing similar to integrated microelectronics.

Aerospike thrust augmentation has been used in large scale thrusters for several applications in the aerospace community, but not in microthrusters. In particular, aerospike rocket engines have been built and tested at launch vehicle length scales, but not at microelectromechanical (MEMS) length scales. These large scale thrusters for launch vehicles provide several hundred thousand pounds or more of thrust in a continuous thrusting application. This is in contrast to the small unit of force associated with microthrusters, typically expressed in impulse units of micro to nano-pound-seconds, for example, which occurs only over an extremely short interval or blow-down time, less than or equal to $10^3$ microseconds. The aerospikes in large scale thrusters have been formed as separate elements supported by struts attached to the thruster and are subject to a thermal management problem, e.g., heating.

There is a need for an improved microthruster that will provide higher thrust efficiency. A second need for development of thrust impulse bits is to make the magnitude of the impulse from microthrusters more uniform and controllable. This feature is valuable for design controllability when combining individual microthrusters to form arrays and for achieving minimum altitude dependence of thrust for either individual microthrusting or arrays of microthrusters. An object of the present invention is to provide an improved microthruster useful, for example, as a propellant for a microsatellite, capable of meeting these needs.

SUMMARY OF THE INVENTION

A microthruster according to the present invention comprises a closed chamber for carrying a fluid with a portion of the chamber less resistant to rupture from elevated fluid pressure than other portions of the chamber. The microthruster further includes an aerospike, which extends outwardly beyond the face of an outer wall of the closed chamber in the vicinity of the portion less resistant to rupture. The aerospike can be either axisymmetric or linear. It has been found that this microthruster of the invention improves the gas dynamics during propulsion for higher thrust efficiency and more controllable and uniform impulse characteristics. The microthruster is particularly useful as a propellant for a microsatellite.

In the disclosed embodiment of the invention, the aerospike is located between two adjacent diaphragms which close the chamber of the microthruster and form an exit section of the chamber which allows exit flow along the surface of the aerospike upon rupture of the diaphragms. It has been found that the introduction of the aerospike in the center of the exit section, opened by use of the two diaphragms in the form of two burst disks (or by an annular burst disk for an axisymmetric aerospike design), thereby allowing exit flow on each side of the aerospike, produces a higher impulse (19% more by calculation), as well as more uniform impulse performance over altitude variations, as compared with the microthrusters of application Ser. No. 08/912,709, which have no thrust augmentation. Preferably, the aerospike is formed integrally with the microthruster, Advantageously, it has been found that there is no thermal management (heating) problem with the aerospike in the microthruster of the invention.

The microthruster of the invention is preferably part of an array configuration comprising a plurality of the microthrusters stacked together, side-by-side, to provide numerous linear (or axisymmetric) impulse bits. The microthrusters of the inner array and those of the outer arrays in the array configuration can be exposed to different external pressure. However, because the bit impulse from the improved microthruster of the present invention is relatively pressure-independent, the array configuration with the microthruster of the present invention produces a more uniform thrust and hence is more controllable, as compared with an array configuration formed of microthrusters of the type disclosed in the aforementioned application Serial No. 08/912,709.

Figure 2:
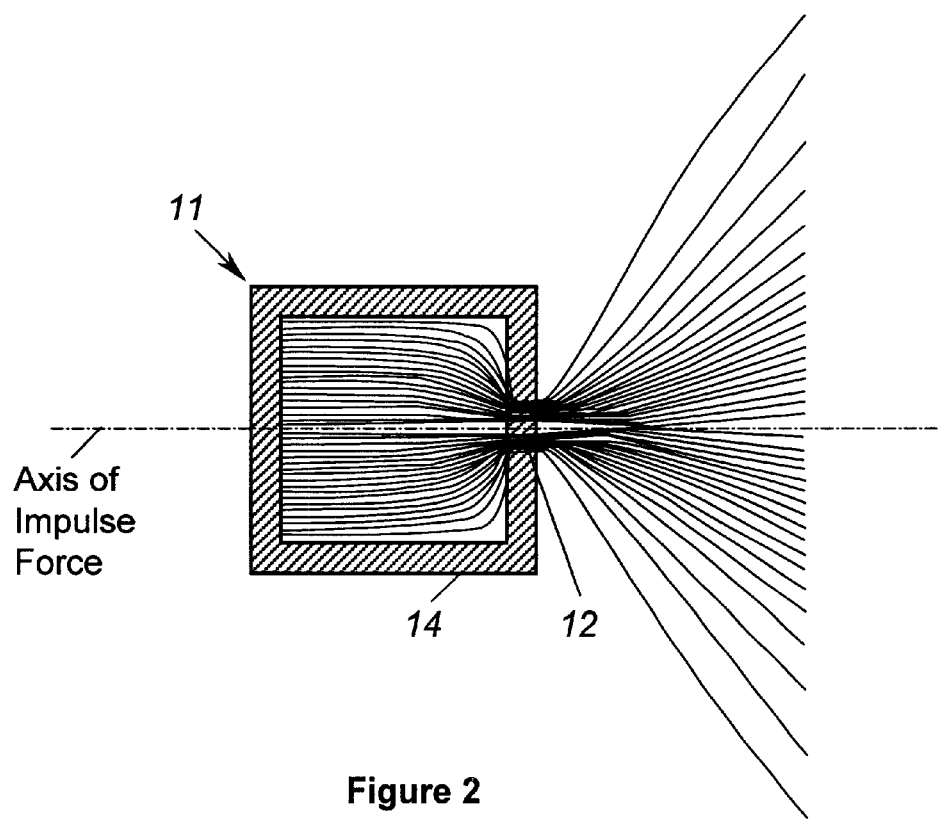
FIG. 2 is a schematic illustration similar to FIG. 1 of a microthruster with aerospike for thrust augmentation according to the present invention, which is an improvement over the microthruster in FIG. 1, and wherein the aerospike extends outwardly beyond a face of an outer wall of the chamber between two diaphragms (or annular diaphragm or burst disk in the axisymmetric design) or burst disks which together form an exit section for fluid propellant from the chamber.
Figure 4:
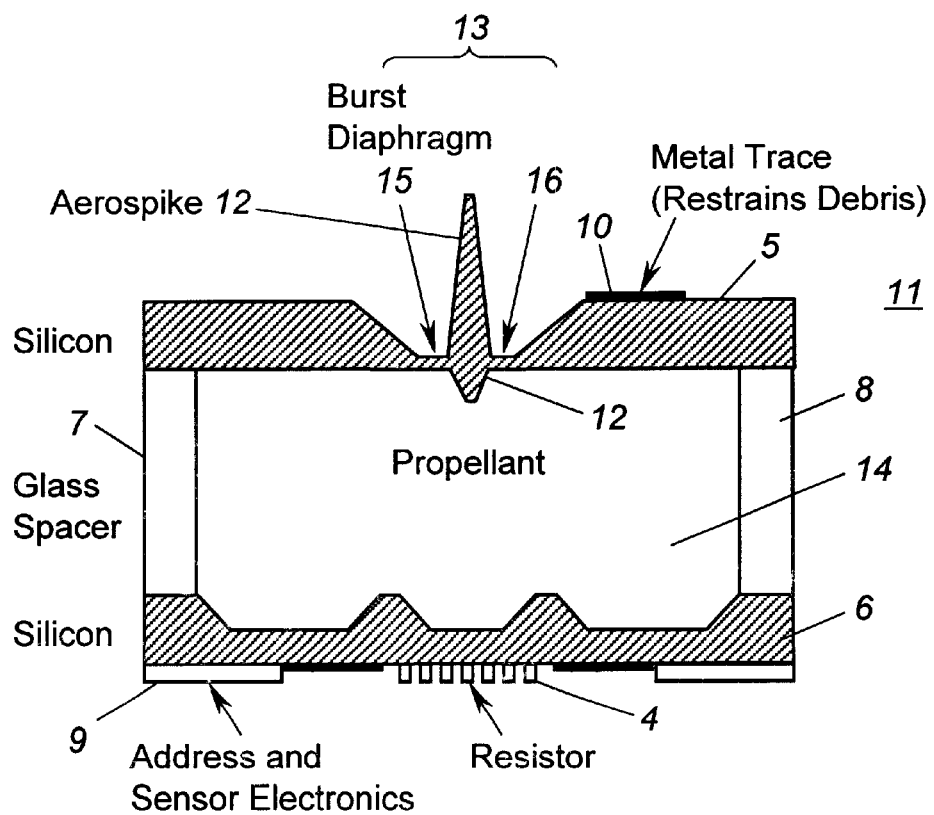
FIG. 4 is a sectional view of the microthruster of the present invention of FIG. 2 shown before rupture of the two diaphragms (or annular diaphragm) of the exit section and expulsion of the fluid propellant.
Figure 5A:
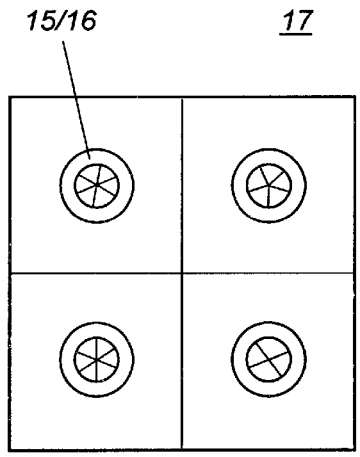
FIG. 5A is a schematic plan view of a 2×2 array configuration of microthrusters of the invention as shown in FIGS.
Figure 5B:
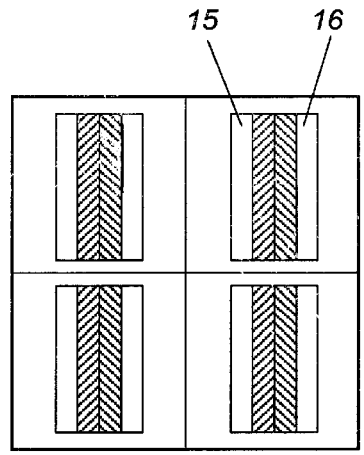
Figure 6:
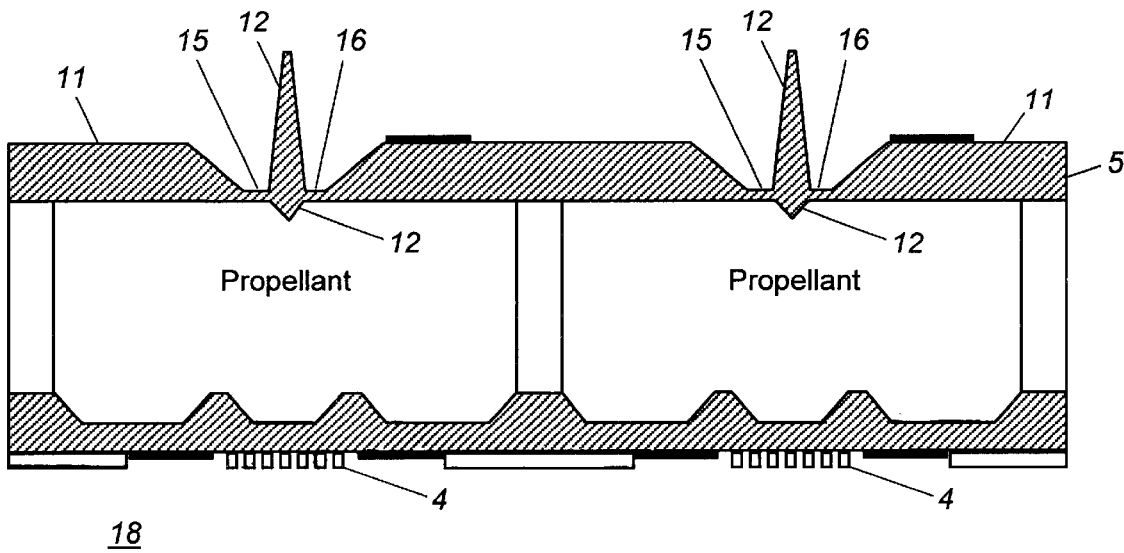

2 and 4, wherein the microthrusters are stacked together side by side to form the array configuration composed of axisymmetric elements with axisymmetric aerospike geometry;

FIG. 5B is a schematic plan view of a 2×2 array configuration of microthrusters of the invention as shown in FIGS. 2 and 4, wherein the microthrusters are stacked together side by side to form the array configuration composed of linear elements with linear aerospike geometry; and FIG. 6 is a cross-sectional view through a portion of a single wafer comprising a plurality of microthrusters of the invention as shown in FIGS. 2 and 4 which are formed integrally as part of the wafer.

DETAILED DESCRIPTION OF DISCLOSED EMBODIMENT

Figure 1:
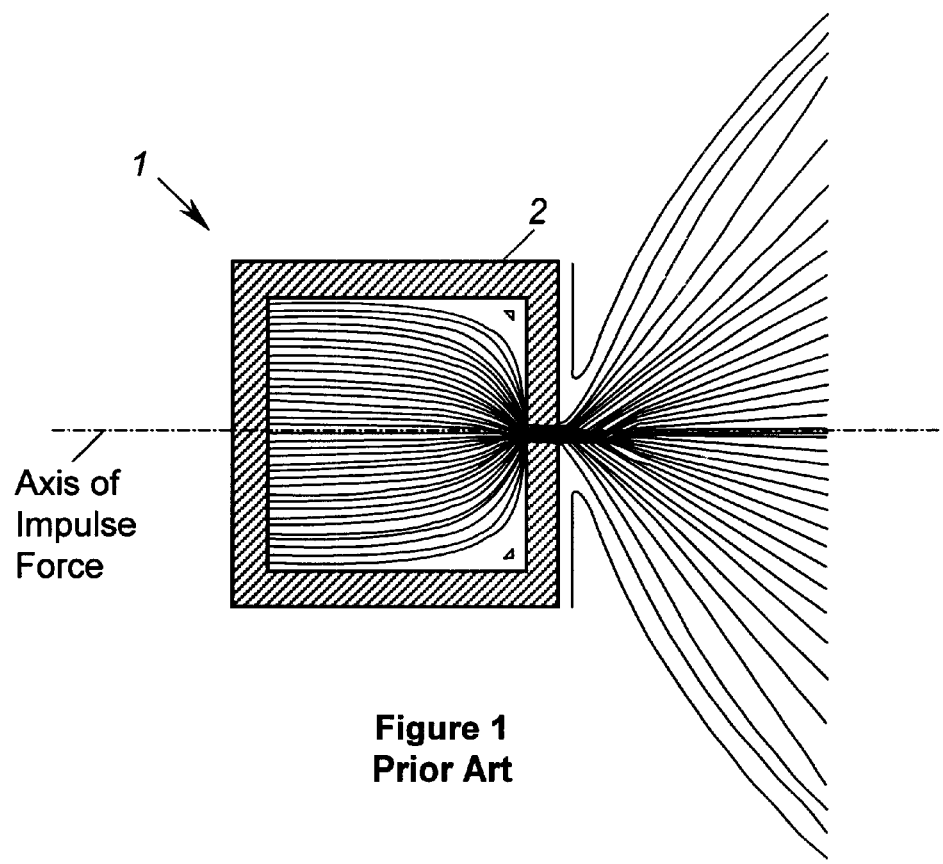
FIG. 1 is a schematic illustration of a microthruster without thrust augmentation, as in prior application Ser. No. 08/912,709, the microthruster being shown in cross-section through its chamber and depicting the streamline contours of the flow of the exhaust gas from the combustion chamber through the nozzle after rupture of the diaphragm or burst disk.
Figure 3:
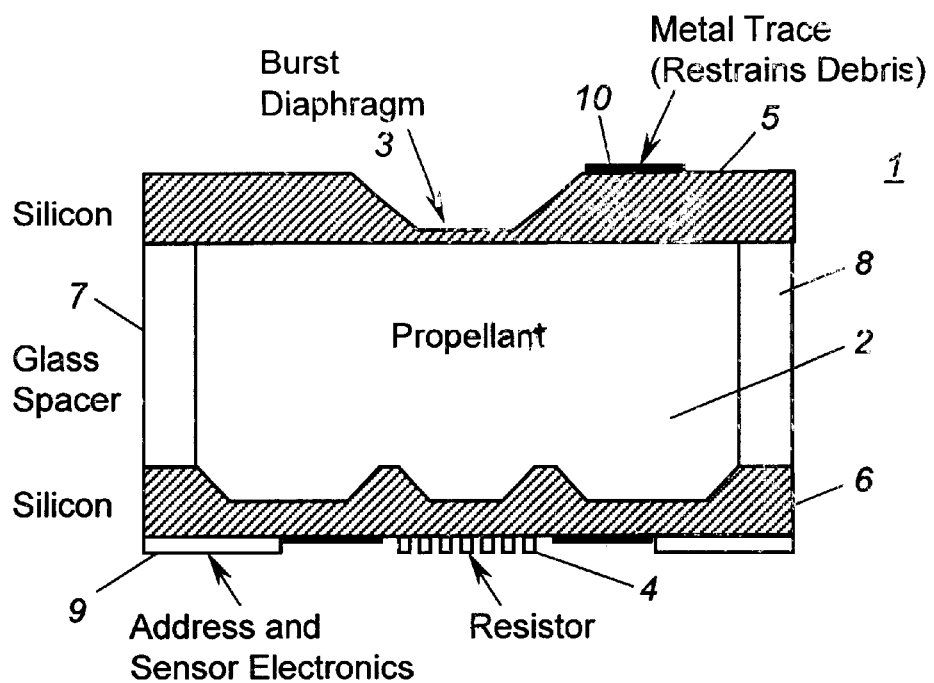
FIG. 3 is a sectional view of the microthruster of FIG. 1 shown before rupture of the diaphragm and expulsion of fluid propellant.

A microthruster 1, without thrust augmentation, of the type disclosed in U.S. patent application Ser. No. 08/912,709, filed Aug. 18, 1997, is shown in FIGS. 1 and 3. As disclosed in application Ser. No. 08/912,709, the microthruster 1 is an electric microthruster, particularly a resistojet thruster, formed with no moving parts. The present invention is not limited to this type of microthruster, but is disclosed in this context in the preferred embodiment depicted in FIGS. 2 and 4-6.

The microthruster 1 is adapted to be fabricated by laser machine techniques, as well as batch processing techniques normally used for microelectronics. The microthruster 1 is subject to relatively precise control and is adapted to provide a unit of force analogous to a bit in a digital logic system and, thus, may be considered as a digital propulsion system. The magnitude of the unit of force may be controlled by the geometry of the chamber 2, the choice of propellant, as well as the number of microthrusters used in a particular application. Arrays of microthrusters can be formed with, for example, $10^4$–$10^6$ or more microthrusters per wafer.

The chamber 2 is formed in a generally cube or other, for example, hexagonal, octagonal, pyramidal, cylindrical, hemispherical, spherical, conical, etc., shape, for carrying a fluid or gas, such as an inert gas, that is closed by a diaphragm 3 which, in the illustrated embodiment, is a portion of the chamber 2 with less resistance to rupture from elevated fluid pressure than other portions of the chamber. Thus, the diaphragm 3 acts as a blow-out disk. An electric resistance element 4 is disposed adjacent (or inside) a side of the chamber 2, opposite the diaphragm 3. When a gas propellant is placed within the chamber 2, thermal energy added to the gas by way of the electrical resistance element 4 causes the gas to expand. When the gas pressure expands to a pressure equivalent to the rupture pressure of the diaphragm 3, the diaphragm ruptures which, in turn, causes the gas to flow out of the chamber, acting as a propellant in the same sense as a punctured balloon. The wall of the chamber 2 about the ruptured diaphragm or burst disk 3 serves as a simple nozzle for the gases being expelled from the microthruster. The gases may be products of burning solid or liquid reactants.

As shown in more detail in FIG. 3, the chamber 2 of microthruster 1 may be formed by top and bottom wafers 5 and 6 of silicon or other suitable material such as silicon nitride, silicon dioxide, Forturan, to make up the wafered construction. The side walls of the chamber 2 may be formed by way of silicon or glass spacers 7 and 8 or other suitable materials. In order to provide relatively accurate control of the microthrusters 1, address and sensor electronics, generally identified with the reference number 9, can be integrated into the microthruster 1, as generally shown in FIG. 3. Thus, in a microsatellite application, the amount of thrust can be relatively accurately controlled electronically in order to control the amount of force. In order to prevent debris from the diaphragm 3 from damaging the particular microsatellite with which it is used, a metal trace 10 may be disposed adjacent the top layer of silicon 5.

Various gases, including inert gases, suitable for use within the chamber 2, include nitrogen, argon, xenon, helium and carbon dioxide. The gases may be products of solid or liquid reactants. An ignitor may also be used in the chamber to enhance performance. The amount of force generated by the microthruster 1 decreases as a function of the elemental size of the microthruster. The force is also a function of the particular gas employed. The predicted blow-down time for the microthruster 1 is dependent on the size of the microthruster, as well as the particular gas utilized. The emptying time is greater for larger size microthrusters. However, in any case, the blow-down time for the microthruster is a relatively short period, typically less than or equal to $10^3$ microseconds.

The microthruster 11 of the present invention illustrated in FIGS. 2 and 4 of the drawings addresses two requirements for microthruster development: production of greater impulse and more controllable impulse as compared with that obtained with a microthruster with no thrust augmentation as in FIGS. 1 and 3. According to the invention, an aerospike 12 is formed integrally with the microthruster in the center of an exit section 13 of the chamber 14 of the microthruster. The exit section 13 is opened by use of two burst disks 15 and 16, which allow exit flow on either side of the body of the aerospike 12 to produce a higher impulse as compared with the microthruster shown in FIGS. 1 and 3. It has been calculated that the impulse of the microthruster 11 is 19% greater than that with the microthruster 1 in FIGS. 1 and 3 having only a simple nozzle opening. In addition, it has been found that the gas dynamics of the aerospike 12 provide more uniform impulse performance over a) altitude variations—the bit impulse will be relatively altitude-independent; and b) under an array configuration consisting of numerous linear impulse bits stacked together side by side—the inner array and outer arrays (which see different external pressure) will produce more uniform thrust and, hence, be more controllable, as compared with an array configuration of microthrusters without thrust augmentation.

In the disclosed embodiment, the aerospike 12 extends outwardly beyond a face of an outer wall of the chamber and is located centrally between the two adjacent diaphragms 15 and 16. The body of the aerospike 12 extends linearly outwardly in the disclosed form thereof and is tapered inwardly in the direction of its outer, e.g., distal end with a straight taper. The axial length of the aerospike along the axis of the intended impulse from the chamber 14 is preferably at least approximately twice the wall thickness of the chamber as depicted in the drawings.

A 2×2 array configuration 17 comprising a plurality of the microthrusters 11 stacked together is illustrated in FIG. 5A. The burst disks 15 and 16 of each microthruster 11 in the array are annular in form for axisymmetric design (or rectangular for linear design), as seen in the plan view of FIG. 5B, and located on respective sides of the aerospike 12. Other array sizes could be employed, e.g., 5×3 or other to as large as 1000×1000 or more, for example.

The microthruster 11 is preferably fabricated by batch microelectronic fabrication methods, as noted above. For example, the fabrication techniques employed in making CMOS patterned electronics could be employed. In such case, the aerospike 12 is formed integrally with the chamber 14, as shown in FIGS. 2 and 4. FIG. 6 illustrates a portion of an array 18 of microthrusters 11, including a plurality of microthrusters, only two of which are shown, formed integrally, as part of a single wafer. The element size of the microthruster 11 in the disclosed embodiment is 900 μm ×900 μm×1400 μm, but other sizes and shapes could be employed. An example of an ignitor which can be provided in the gas filled chamber 14 of the microthruster to improve performance is lead styphnate or other propellants which is fired by a large current pulse through resistor 4 of the microthruster.

While we have shown and described a preferred embodiment of the microthruster according to the present invention, as will be recognized by one skilled in the art, many modifications and variations of the present invention are possible in light of the above teachings. Thus, it is to be understood that, within the scope of the appended claims, the invention may be practiced otherwise and as specifically described above.

We claim:

1. A microthruster for use as a propellant device for a microsatellite, the microthruster comprising:

a chamber for carrying a fluid which can be pressurised;

a diaphragm in a wall of said chamber for closing said chamber, said diaphragm being rupturable when the fluid pressure in said chamber is increased to a rupture pressure of said diaphragm so that the fluid flows out of an exit section for fluid propellant from the chamber creating a thrust impulse over a blow-down time, the size of said microthruster being selected such that the blow-down time of said microthruster is <$10^3$ microseconds; and an aerospike formed integrally with the wall of the chamber of said microthruster in the center of said exit section of the chamber and extending outwardly beyond an outer face of the wall of said chamber in the vicinity of said diaphragm from a location inwardly of an inner face of the diaphragm so as to dynamically interact with the fluid being expelled from the chamber upon rupture of the diaphragm to provide an increased and more controllable impulse.

2. The microthruster according to claim 1, wherein said aerospike is located between two adjacent diaphragms closing said chamber in said exit section.

3. The microthruster according to claim 2, wherein said aerospike is located centrally between said two adjacent diaphragms.

4. The microthruster according to claim 1, wherein said aerospike extends linearly outwardly from said chamber.

5. The microthruster according to claim 1, wherein said aerospike is tapered inwardly in the direction of its distal end.

6. The microthruster according to claim 1, wherein said aerospike is tapered inwardly in the direction of its distal end with a straight taper.

7. The microthruster according to claim 1, wherein said aerospike has an axial length along a direction of an intended impulse from said chamber of at least approximately twice the wall thickness of said chamber.

8. The microthruster according to claim 1, wherein said microthruster is part of an array configuration comprising a plurality of said microthrusters stacked together.

9. The microthruster according to claim 1, wherein said microthruster is part of an array including a plurality of said microthrusters integrally formed as part of a single wafer.

10. The microthruster according to claim 1, wherein said microthruster is fabricated by batch microelectronic fabrication methods.

11. The microthruster according to claim 1, wherein said aerospike is formed integrally with said chamber by batch microelectronic fabrication methods.

12. The microthruster according to claim 1, wherein said diaphragm is in the form of a blow-out disk adapted to be ruptured by elevated fluid pressure in said chamber for producing a unit of force.

13. The microthruster according to claim 1, further comprising an electric resistance element disposed relative to said chamber to transfer thermal energy to the fluid in the chamber.

14. A microthruster for creating a thrust impulse, said microthruster comprising:

a closed chamber for carrying a propellant with a portion of said chamber less resistant to rupture from elevated fluid pressure therein than other portions of said chamber; and an aerospike formed integrally with the wall of said chamber of the microthruster and extending outwardly beyond an outer face of the wall of said closed chamber in the vicinity of said portion from a location inwardly of an inner face of said portion so as to dynamically interact with the fluid propellant expelled from said chamber when said portion is ruptured to provide an increased and more controllable impulse.

15. The microthruster according to claim 14, wherein said portion of said chamber less resistant to rupture comprises two adjacent burst disks located on respective sides of said aerospike.

16. The microthruster according to claim 14, wherein said aerospike is formed integrally with said chamber by batch microelectronic fabrication methods.

17. The microthruster according to claim 14, wherein said microthruster is part of an array configuration comprising a plurality of said microthrusters stacked together.

18. The microthruster according to claim 14, wherein said microthruster is part of an array including a plurality of said microthrusters integrally formed as part of a single wafer.

19. The microthruster according to claim 14, wherein said aerospike has an axial length in a direction of an intended thrust impulse from said chamber at least approximately twice the wall thickness of said chamber.

20. The microthruster according to claim 14, wherein the volume of said closed chamber is such that the microthruster has a blow-down time on the order less than or equal to lo microseconds.

21. The microthruster according to claim 14, further comprising means for transferring thermal energy to said propellant in said chamber.

* * * * *